United States Patent [19]

Schilling et al.

[11] Patent Number: 4,787,960
[45] Date of Patent: Nov. 29, 1988

[54] CATIONIC AND ANIONIC LIGNIN AMINE SIZING AGENTS

[75] Inventors: Peter Schilling, Charleston; Patti E. Brown, Goose Creek, both of S.C.

[73] Assignee: Westvaco Corporation, New York, N.Y.

[21] Appl. No.: 172,807

[22] Filed: Mar. 28, 1988

Related U.S. Application Data

[62] Division of Ser. No. 76,948, Jul. 23, 1987.

[51] Int. Cl.$^4$ ............................. D21D 3/00; D21H 3/18
[52] U.S. Cl. ...................................... 162/158; 162/180
[58] Field of Search ............................................ 162/158

[56] References Cited

U.S. PATENT DOCUMENTS

| 2,709,696 | 5/1955 | Wiest et al. | 260/124 |
| 2,863,780 | 12/1958 | Ball, Jr. | 106/14 |
| 3,407,188 | 10/1968 | Cavagna | 260/124 |
| 3,470,148 | 9/1969 | Allan | 260/124 |
| 3,790,606 | 2/1974 | Sellet | 162/158 X |
| 3,857,830 | 12/1974 | Briggs | 260/124 R |
| 3,935,101 | 1/1976 | Briggs | 210/47 |
| 4,065,349 | 12/1977 | Bateman et al. | 162/158 |
| 4,455,257 | 6/1984 | Hoftiezer et al. | 260/124 R |

FOREIGN PATENT DOCUMENTS 1018519 10/1977 Canada ............................ 260/133

Primary Examiner—Earl Nielsen
Attorney, Agent, or Firm—Terry B. McDaniel; Richard L. Schmalz

[57] ABSTRACT

Lignin amines are disclosed which are characterized by high nitrogen content and are water soluble at both alkaline and acidic pH values. The lignin amines have utility as flocculants, filtration aids, precipitants, scale inhibitors, asphalt emulsifiers, fluid loss additives, oil well cement additives, corrosion inhibitors, retention aids, cationic dispersants, and tall oil pitch emulsifiers.

12 Claims, No Drawings

CATIONIC AND ANIONIC LIGNIN AMINE SIZING AGENTS

This is a division of application Ser. No. 076,948, filed July 23, 1987.

BACKGROUND OF THE INVENTION

This invention relates to protonated lignin-polyamines, quaternary ammonium salts of lignin polyamines and sodium-, potassium-, salts of lignin polyamines.

The objective of this invention is to provide new improved lignin amines, which are characterized by high nitrogen content and water soluble at both alkaline and acidic pH values. In addition, a wide variety of applications for these products is described.

The most widely applicable method to introduce a nitrogen functionality into lignin is by the Mannich Reaction, which involves condensation of ammonia, primary or secondary amine and a suitable aldehyde onto the unsubstituted position ortho to the phenolic hydroxyl group. The manufacture of amines from kraft lignin by this method is disclosed in U.S. Pat. No. 2,863,780 by J. C. Ball and U.S. Pat. No. 2,709,696 by E. G. Wiest. Kraft lignin is obtained from the spent lignin of the kraft pulping process by acidification. This lignin is insoluble in water at pH values from 1 to 7 and soluble at pH values of 8 and above. The preparation of aminoalkylated lignin prepared from hydroxyphenylated lignosulfonate is disclosed in U.S. Pat. No. 4,017,475 by C. H. Ludwig. Lignosulfonates are isolated from spent sulfite liquors, a by-product of the sulfite pulping process. Dihydro-oxazine derivatives of kraft lignin obtained by reaction of kraft lignin with methyl amine and formaldehyde are disclosed in Canadian Pat. No. 1,018,520 by A. B. McKague, quaternary ammonium salts based on aminomethylated lignins are disclosed in U.S. Pat. No. 3,407,188 by G. A. Cavagna, and Canadian Pat. No. 1,018,519 by A. B. McKague. A variety of kraft and sulfite lignins containing quaternary ammonium-fuctionalities are disclosed in U.S. Pat. Nos. 3,470,148 and 3,600,308 by G. G. Allan and in U.S. Pat. Nos. 3,857,830 and 3,935,101 by W. S. Briggs.

In the recent U.S. Pat. No. 4,455,257 by H. W. Hoftiezer, et al., the "cationic" reaction products of kraft lignin with aldehyde and polyamine are disclosed. These products and the above described Mannich-lignin amines are useful as flocculating agents for clay and other finely divided materials. However, the reaction products of lignin, formaldehyde and polyamines, as described in U.S. Pat. No. 4,455,257, in fact, are not soluble at acidic pH values and they are also not in solution when they are prepared at alkaline pH values.

DESCRIPTION OF THE PREFERRED EMBODIMENT

This invention describes a method whereby lignin-polyamine-aldehyde condensates are obtained which are soluble in water at both acidic and alkaline pH values.

Although the polyamines behave as bases, their basicity is not high enough to dissolve kraft lignin in water to yield 25–30% solutions by weight. By blending polyamines with kraft lignin in aqueous suspensions as described in U.S. Pat. No. 4,455,257, heterogeneous mixes are obtained which do not become homogeneous upon heating. In contrast to this procedure, homogeneous solutions are obtained when water-insoluble precipitated kraft lignin is slurried in water and the pH value is increased to at least 10 by addition of sodium hydroxide or potassium hydroxide, and the proper amount of a polyamine is added. The Mannich reaction is carried out by addition of formaldehyde or other suitable aldehydes to these blends and heating to 50°–100° C. The lignins have undergone the Mannich reaction when upon dilution to 10% solids and addition of dilute hydrochloric acid, clear solutions at pH values of 1.0–4.0 are obtained.

This disclosure describes lignin amines which have many applications, including flocculants, filtration aids, precipitants, scale inhibitors, asphalt emulsifiers, fluid loss additives, oil well cement additives, corrosion inhibitors, retention aids, cationic dispersants, and tall oil pitch emulsifiers.

It has been shown that various lignin sources can be used as starting material for the Mannich reaction as described below (I–III):

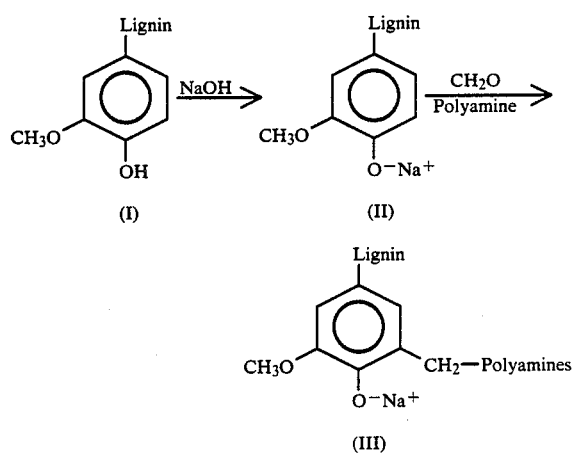

Softwood and hardwood lignin derived from the kraft pulping process are the preferred raw materials, with softwood lignin having the higher molecular weight and lower number of methoxy groups in the molecule. A technical description of kraft lignin can be found in Lignin, Occurrence, Formation, Structure and Reaction, K. V. Sarkanen and C. M. Ludwig, Eds., Wiley-Interscience: New York-London-Sidney-Toronto 1971, p. 639–691.

The number of active reaction sites for the methylolation (formaldehyde condensation) can be increased by reaction of kraft lignins with strong bases whereby demethylation of the methoxy-groups occurs:

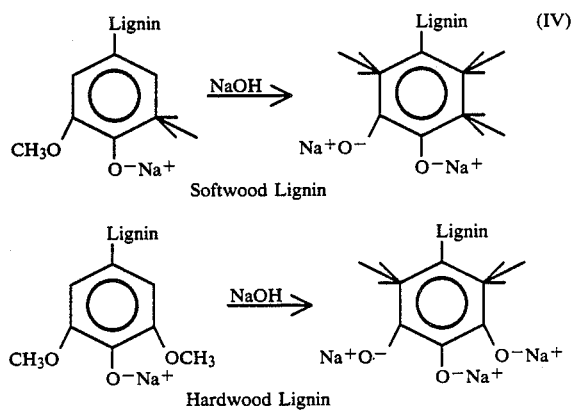

← - Reactive Sites for formaldehyde condensation

This demethylation can be achieved also by heat treatment of the sodium or potassium lignates in the presence of amines or polyamines used for the subsequent Mannich reaction.

Another suitable lignin is that derived from the vanillin process, in which sulfite lignin is oxidized under pressure, resulting in degradation to vanillin and residual lower molecular weight lignin, containing a minimal number of sulfonic acid groups. Generally, lignosulfonic acids isolated from spent sulfite liquors can be desulfonated by heat treatment with strong bases such as sodium hydroxide or potassium hydroxide, as well as amines or polyamines.

Lignin amines containing a significant amount of sulfonic acid groups can be obtained by using lignosulfonic acids as starting material. These products are either isolated from spent sulfite pulping liquors or can be derived by high temperature sulfonation, oxidative sulfonation at ambient temperature, or sulfomethylation (reaction with sodium sulfite and formaldehyde) of kraft lignin, i.e., sulfonated kraft lignin.

Alkaline bark extracts or peat moss are also useful aromatic starting materials for the aminoalkylation.

Prior to the Mannich reaction the lignins can be modified to suit specific applications. The molecular weight may be increased by reacting kraft lignin or any other suitable lignin, such as modifiied kraft lignins and lignosulfonates, with 0.1–1 mole of a crosslinking agent per 1,000 grams of lignin. Crosslinking may occur by binding two lignin molecules via unsubstituted ring positions (V). Aldehydes, such as formaldehydes or di-aldehydes such as glyoxal or glutaraldehyde are suitable reagents for this reaction. Unsaturated aldehydes such as acrolein or crotonaldehyde may also be used.

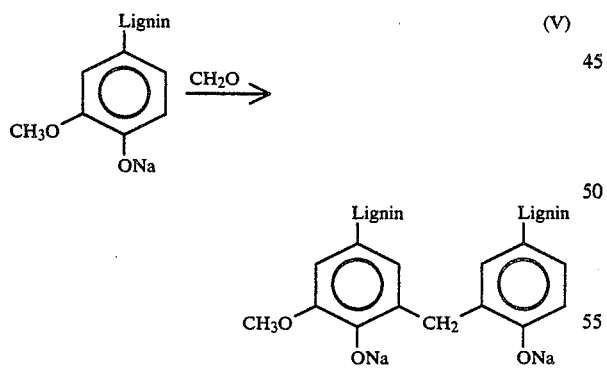
(V)

Another option to induce crosslinking and molecular weight via the aromatic nuclei is oxidation. One-electron transfer oxidants such as potassium ferricyanide, are the preferred agents, but alkali metal persulfates, hypochlorites or peroxides may also be used. In these oxidations the alkali lignates are oxidized to the corresponding short lived radicals (VI), which upon combination form aryl-aryl linkages (VII), or phenoxyl-aryl linkages (VIII), resulting in increased molecular weight.

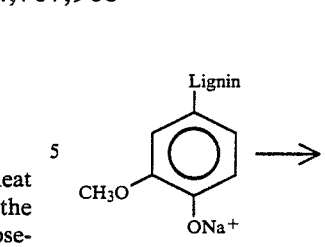
(VI)

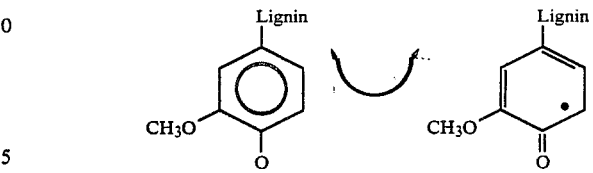

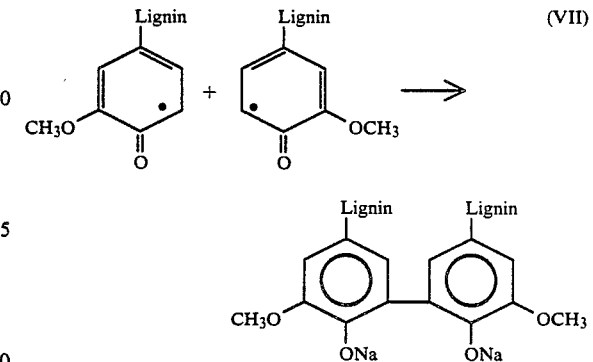
(VII)

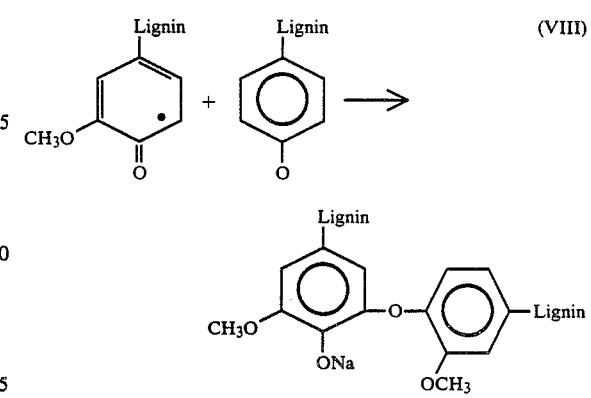
(VIII)

Lignins with increased molecular weight also can be obtained by reacting the corresponding alkali lignates with bi-functional or tri-functional alkylating agents such as di-halo alkanes (IX), epichlorohydrin (X), polyethylene oxides or polypropylene oxides with terminal reactive groups such as chloride, bromide, tosylate (XI), diepoxides (XII), or cyanurchloride (XIII).

$X-(CH_2)_z-X$ (IX)
$X = Cl, Br, I$
$z = 1-10$

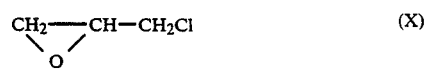
(X)

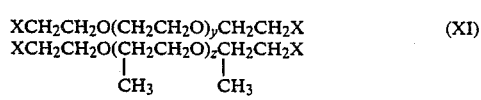
(XI)

$X = Cl, Br, J, CH_3C_6H_4SO_3^-$
$y = 0-100$
$z = 1-10$

-continued

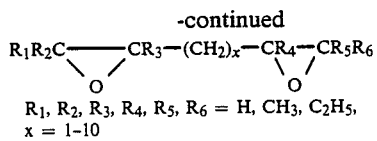   (XII)

R₁, R₂, R₃, R₄, R₅, R₆ = H, CH₃, C₂H₅,
x = 1-10

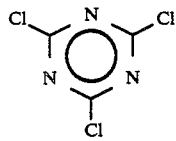   (XIII)

Lignins also can be modified to suit certain applications without significantly changing the molecular weight by partial alkylation of the phenolic hydroxyl groups under alkaline conditions. Alkylating agents useful for this modification are alkylhalides, alkylsulfates or alkylphosphates (XIV), and epoxides such as ethylene oxide, propylene oxide, butylene oxide (XV), styrene oxide (XVI), and cyclohexene oxide (XVII).

$(R)_yX$   (XIV)
R = CH₃—, C₂H₅—, C₆H₅CH₂—,
X = Cl, Br, J, SO₄, PO₄
y = 1-3

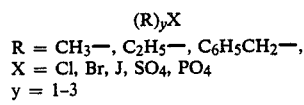   (XV)

R = H—, CH₃—, C₂H₅—,

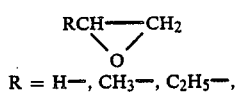   (XVI)

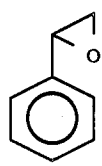   (XVII)

Alkylating agents containing sulfonic acid groups such as haloalkane sulfonic acids (XVIII), chlorohydroxy propane sulfonic acid (XIX) or propane sultone (XX) are also useful to modify lignin via O-alkylation.

$X(CH_2)_ySO_3Na$   (XVIII)
X = Cl, Br, I
y = 1-5

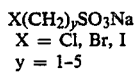   (XIX)

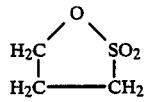   (XX)

Haloalkane carboxylic acid (XXI), acrylic acid (XXII), methacrylic acid (XXIII) or acrylonitrile (XXIV) may be used to introduce carboxy-functionalities into the lignin molecular prior to aminoalkylation.

$X(CH_2)_yCOONa$   (XXI)
X = Cl, Br, J, OSO₃C₆H₄CH₃
y = 1-5

-continued $CH_2=CHCOOH$   (XXII)

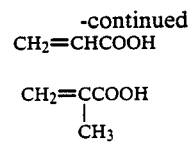   (XXIII)

$CH_2=CHCN$   (XXIV)

Alkylating agents containing nitrogen are dialkyl aminoalkyl halides (XXV) or the quaternary trialkyl ammonium salts (XXVI) derived from epichlorohydrin and tertiary amines.

$X(CH_2)_yNR_1R_2$   (XXV)
X = Cl, Br, J,
R₁, R₂ = CH₃—, C₂H₅—, C₆H₅CH₂—
y = 2-10

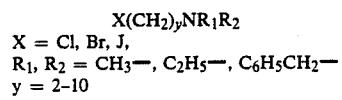   (XXVI)

R = CH₃—, C₂H₅—

All the above described modifications of lignin or lignosulfonates can be carried out in aqueous solution or, when necessary, in organic solvents or mixtures of organic solvents and water.

Polyamines suitable to undergo the Mannich reaction with formaldehyde or other aldehydes as well as polyaldehydes are imidazoline forming polyethylene amines and polyamines characterized by at least one ethylene diamine functional group with at least three hydrogens attached to the two nitrogens (XXVII). Compounds of this group which are able to give both amidoamines and imidazolines are: ethylene diamine, diethylene triamine, triethylene tetramine, tetraethylene pentamine, pentaethylene hexamine, and higher homologues; N-aminoethylpropane-diamine, N,N-diaminoethyl propane diamine and the N-aminoethyl or N,N-diaminoethyl substituted butane diamines, pentane diamines and hexane diamines, as well as N-hydroxy ethyl ethylene diamine. These compounds have the general formulae:

$H_2NCH_2CH_2NHR$   (XXVII)
R = H—, CH₃—, C₂H₅—, C₃H₇—,
—CH₂CH₂OH, —(CH₂CH₂NH)ₓH
x = 1, 2, 3, 4, ... 10 or $R_1R_2N(CH_2)_yNHR_3$
R₁ = H—, CH₃—, C₂H₅—, C₃H₇—, NH₂CH₂CH₂—,
R₂ = H—, CH₃—, C₂H₅—,
R₃ = H—, CH₃—, C₂H₅—, C₃H₇—, NH₂CH₂CH₂—,
y = 2, 3, 4, 5, 6.

Amines capable of forming amidoamines but not imidazolines are: 1,3-diaminopropane; 1,4-diaminobutane; 1,5-diaminopentane; 1,6-diaminohexane; piperazine (1,4-diazacyclohexane); N-aminoethyl piperazine; N-hydroxyethyl piperazine; N-aminopropyl-propane diamine; 1,3-N-methyl N-aminopropylpropane diamine; 1,3-N,N-dimethylpropane diamine; 1,3-N,N-diethyl propane diamine; 1,3-N,N-dimethylethylene diamine; N,N-diethylethylene diamine; N-aminohexyl hexane diamine-1,6.

Diamines whereby the amino groups are separated by polyethylene oxide chains or polypropylene oxide chains are also very suited for the Mannich reaction.

$$H_2NCH_2CH_2O(CH_2CH_2O)_xCH_2CH_2NH_2 \quad \text{(XXVIII)}$$

$$\underset{\underset{CH_3}{|}}{H_2NCH_2CH_2O}(\underset{\underset{CH_3}{|}}{CH_2CH_2O})_y\underset{\underset{CH_3}{|}}{CH_2CH_2NH_2}$$

x = 0–100
y = 0–100

The above described amines can be further modified by reaction with any of the alkylating agents or crosslinking agents (IX–XVI) described in connection with lignin modification. Modified amines or amines mixtures with increased molecular weight or amines which have additional reactive functionalities such as sulfonic acid, carboxyl, hydroxyl, nitrile, and quaternary-ammonium groups will be obtained. For the aminomethylation, however, it is necessary that at least one hydrogen on any of the nitrogens of the parent polyamine be available for the condensation with formaldehyde.

Suitable reactants for the Mannich reaction are: aldehydes such as formaldehyde (the preferred reagent), benzaldehyde, or other tertiary aldehydes; dialdehydes such as glutaraldehyde and glyoxal; or unsaturated aldehydes such as acrolein or croton aldehyde.

Generally, the reaction is carried out by suspending the acid-insoluble precipitated kraft lignin in water at a solids content of 15–30%, and adjusting the pH value to 10–12 by addition of potassium hydroxide or sodium hydroxide. At this point most of the lignin has undergone dissolution. In the subsequent step the proper amount of the desired amine is added. The addition of the amine is accompanied by a temperature increase and increase in pH value. To the homogeneous mixture of potassium or sodium lignate and polyamine the required amount of aldehyde is added and heated for 2–20 hours at 50°–100° C. The reaction can also be carried out by precondensing polyamine and aldehyde at ambient temperature and adding this precondensate to the alkaline solution of lignin. The preferred reaction medium is water, or, if required, mixtures of water and organic solvents. Organic solvents also can be used for this reaction.

To fit certain applications, the lignin-formaldehyde polyamine condensates may be further modified by reaction with any of the above mentioned crosslinking agents, or alkylating agents (IX–XVI).

These reagents will react with both the nitrogens of the polyamino functionalities and the phenolic hydroxyl groups of the lignin. The reaction product of kraft lignin with aminoethylpiperazine, formaldehyde, and chlorohydroxypropyl-trimethyl ammonium chloride will serve as an example of a highly cationic lignin:

(XXIX)

(XXX) or isomeric structures (XXXI)

In most cases the pH values of the lignin polyamine solutions are above 10. For certain applications, such as flocculation of finely dispersed matter, it has been found that the protonated lignin polyamines which bear a highly positive charge perform in a fashion superior to the parent lignin amine in the form of the sodium or potassium salt. This charge reversal is achieved by diluting the alkaline lignin polyamine solution to the proper concentration and adjusting the pH value to 1–4 by addition of a suitable mineral or organic acid such as hydrochloric acid, hydrofluoric acid, sulfuric acid, acetic acid or formic acid. In many applications, solutions of the ingredients which perform the desired functions are applied. However, in certain instances dry ingredients are the preferred additives.

Since the lignin-formaldehyde-polyamine condensates behave as aminoplasts, polymerization occurs when solutions are spray dried or tray dried at elevated temperatures rendering the lignin insoluble. This polymerization reaction occurs at alkaline as well as acidic pH values. It has been found that the addition of low molecular weight substances which are stable at these pH values and which will react with formaldehyde will suppress or terminate the polymerization, yielding soluble dry lignin-polyamines of the desired molecular weight. Below pH 7, the preferred spray drying aid is urea, which at a concentration of 1-5% based on the weight of the lignin polyamine insures that a water soluble, dry lignin-polyammonium hydrochloride (acetate, formate, etc.) is obtained. Above pH 7, the preferred spray drying acid is phenol, of which 1-5% concentration based on the weight of the lignin polyamine will ensure that a water soluble dry lignin-polyamine-alkali-salt will be obtained.

The practice of this invention may be seen in the following examples wherein preparation of various types of lignin-polyamine-aldehyde condensates and their applications are described.

EXAMPLE 1

Kraft lignin reacted with ethylene amine E-100 according to Example 6 of U.S. Pat. No. 4,455,257, which procedure is incorporated herein by reference, resulted in a water insoluble reaction product which was not soluble at acidic pH values. However, when the reaction was carried out in the presence of sodium hydroxide, a clear solution of the reaction products resulted. The kraft lignin/E-100 prepared according to this procedure were soluble at pH values ranging from 1.5–3.0.

EXAMPLE 2

The improved procedure can be also shown by the performance of the polyethylene-kraft lignin condensate as flocculant for secondary papermill sludge. Addition of 0.5% of these products based on sludge solids (1.93% solids concentration) and pH-value adjustment to 2.5 resulted in filtration times of 35.7 sec. and 52.8 sec. for 100 ml sludge. The product prepared according to this invention with sodium hydroxide present resulted in better floc-formation and thus faster filtration rates.

EXAMPLE 3

Into 400 ml of water is slurried 100 grams precipitated softwood kraft lignin, and the pH value is adjusted to 11.0 by adding 50% sodium hydroxide dropwise. After the pH value remains constant, 25–125 grams aminoethylpiperazine is added and stirred for 30 minutes. The concentration of the blend is adjusted to 25% by addition of the proper amount of water. To the well-stirred mixture 16.2–81.1 grams 37% formaldehyde is added and heated at 95°–100° C. for 3–16 hours.

EXAMPLE 4

Into 400 ml of water is slurried 100 grams precipitated softwood kraft lignin and the pH value is adjused to 11.0. After addition of 8.1 grams 37% formaldehyde the reaction mixture is heated at 90° C. for 12–16 hours. The mixture is then cooled to 70° C., and 25–125 grams aminoethylpiperazine and 50–250 grams water are added. The mixture is stirred for 30 minutes, and 16.2–81.1 grams 37% formaldehyde is added and after dilution to 20% solids is heated at 95°–100° C. for 3–16 hours.

EXAMPLE 5

Into 400 ml water is slurried 100 grams precipitated softwood kraft lignin, and the pH value is adjusted to 11.5 by addition of 50% sodium hydroxide. The temperature is increased to 70° C., and with vigorous stirring 4.5 grams epichlorohydrin is added dropwise. After two hours the epichlorohydrin has disappeared, and the pH value is readjusted to 11.0. To this mixture 20–100 grams diethylenetriamine is added and stirred for 30 minutes followed by the addition of 16.2–81.1 grams 37% formaldehyde and dilution to 20% solids. The mixture is then heated 95°–100° C. for 5–16 hours.

EXAMPLE 6

Into 1,000 ml water is slurried 200 grams precipitated softwood kraft lignin, and sodium hydroxide (20% based on weight) is added. The reaction mixture is then transferred to a pressure reactor (Parr reactor) and heated to 180°–200° C. for 5–8 hours. After cooling, the reaction mixture is diluted to 15% solids; and the pH value is lowered to 2 by the addition of 10% sulfuric acid. The precipitated demethylated lignin is filtered through a Buchner funnel and washed several times with water.

Into 400 ml is slurried 100 grams of the precipitated-demethylated softwood lignin, and the pH value is adjusted to 11.0 with 10% sodium hydroxide. To this mixture 28.5–145 grams triethylenetetramine is added slowly and stirred for 30 minutes. After the addition of 16.2–81.1 grams 37% formaldehyde and dilution to 20% solution, it is heated at 95°–100° C. for 4–16 hours.

EXAMPLE 7

Into 400 ml water is slurried 100 grams precipitated kraft lignin, and the pH value is adjusted to 11.0 by addition of 50% sodium hydroxide. With good stirring 32 grams 60% solution of DOWQUAT 188® (chlorohydroxypropyltrimethyl ammonium chloride) is added and heated to 70° C. for 5 hours. At the end of this period the pH value is readjusted to 11.0 with sodium hyroxide, and 25–125 grams aminoethylpiperazine is added and stirred for 30 minutes. After the addition of 16.2–81.1 grams 37% formaldehyde and dilution to 20% solids, the reaction mixture is heated at 95°–100° C. for 3–17 hours.

EXAMPLE 8

Into 400 ml water is slurried 100 grams precipitated softwood kraft lignin, and the pH value is adjusted to 11.0 with 50% sodium hydroxide. To this solution is added 200 ml 5% sodium hypochlorite solution and the mixture heated to 90° C. for 1 hour. After cooling, 20–100 grams triethylenetetramine and 16.2–81.1 grams 37% formaldehyde are added and diluted with water to 20% solids followed by heating at 95°–100° C. for 4–12 hours.

EXAMPLE 9

Into 400 ml water is slurried 100 grams precipitated softwood kraft lignin, and the pH value is adjusted to 11.0 with 50% sodium hydroxide. To this solution are added 25–125 grams aminoethylpiperazine and 16.2–81.1 grams 37% formaldehyde. It is then heated at 95°–100° C. for 4–16 hours. After cooling, 32–320 grams 60% DOWQUAT 188 ® solution is added in small increments. During the addition, the pH value is kept at 10.5–11.0 by adding increments of 50% sodium hydroxide. It is heated at 60°–70° C. for 3–5 hours.

EXAMPLE 10

Into 400 ml water is slurried 100 grams precipitated hardwood kraft lignin and the pH value adjusted to 11.0 with 50% sodium hydroxide. To this solution is added 9 grams propylene oxide and the reaction mixture stirred overnight at 50° C. (in a pressure reactor). To this is added 20–100 grams diethylene triamine and 16.2–81.1 grams formaldehyde, and after dilution to 20% solids the reaction mixture is heated at 95°–100° C. for 4–12 hours.

EXAMPLE 11

Into 400 ml water is slurried 100 grams precipitated softwood kraft lignin and 31.5 grams sodium sulfite and 4.1 grams 37% formaldehyde added. The solids content is adjusted to 25%, and the mixture is transferred into a pressure reactor (Parr reactor). It is then heated at 125°–135° C. for 3 hours and cooled. To this solution are added 50 grams aminoethylpiperazine and 34 grams 37% formaldehyde. After adjustments of the solids content to 25%, the solution is heated at 95°–100° C. for 6 hours.

EXAMPLE 12

This example shows how the anionic form of the lignin polyamine is transformed into the cationic species, the active form to be used in flocculation, precipitation, and retention of finely divided matter.

The alkaline solution of a lignin polyamine prepared according to Example 1 through 9 is adjusted to 10% solids with water or a water miscible solvent and the addition of dilute hydrochloric acid, sulfuric acid, phosphoric acid, acetic acid or formic acid; the pH value is lowered to 1–3. With the exception of the quaternized lignin polyamines, the lignin amines precipitate out of solution at the neutral pH value coinciding with their isoelectric points. Therefore, to ensure fast dissolution, vigorous agitation is recommended.

EXAMPLE 13

To 103 grams diethylenetriamine diluted with 309 grams water, 45 grams epichlorohydrin is added very slowly over a period of 1 hour and kept at 50° C. for 4 hours. Into 400 ml water 100 grams precipitated softwood kraft lignin is slurried, and the pH value adjusted is 11.0 with 50% sodium hydroxide. To the lignin solution 29.6 grams diethylenetriamine/epichlorohydrin reaction product (91.4 grams of the above solution) and 16.2 grams 37% formaldehyde are added and heated at 90° C. for 5 hours.

EXAMPLE 14

To 103 grams diethylenetriamine diluted with 309 grams water, 316 grams 60% DOWQUAT 188 ® solution is added with stirring and heated at 70° C. for 3 hours. It is cooled, and 80 grams 50% sodium hydroxide is added. Into 400 grams water 100 grams precipitated softwood kraft lignin is slurried, and the pH value is adjusted to 11.0 with 50% sodium hydroxide. To this solution 59 grams of the diethylenetriamine/DOWQUAT 188 ® reaction product (161.6 grams of the above solution) and 16.2 grams 37% formaldehyde are added and heated to 90° C. for 6 hours.

EXAMPLE 15

This example shows the utility of the lignin polyamines as dewatering aids for secondary papermill sludge. To 200 ml secondary papermill sludge various amounts of PERCOL 763 ®, a cationic polyacrylamide (Allied Colloids), and/or an acidified lignin amine solution is added with gentle stirring. The flocculated sludge is filtered on a Buchner funnel under vacuum (25 psi), and the time required to collect 100 ml filtrate is measured.

Table I shows the improvement in filtration rate of the sludge, color reduction of the filtrate, and the synergistic effect on both properties when a high cost synthetic cationic polyacrylamide is added to the lignin polyamine. Several other lignin-formaldehyde-polyamine condensates prepared with ethylenediamine, diethylenetriamine, triethylenetetramine or higher homologues are as effective.

TABLE I
FILTRATION OF SECONDARY PAPER MILL SLUDGE

| Flocculant[a] | Filtration Time (sec.) | Color of Filtrate |
|---|---|---|
| No flocculant added | 185 | yellow |
| 250 mg Lignin amine as sodium salt[b] | 192 | yellow |
| 50 mg Lignin amine as ammonium chloride[c] | 90 | slightly yellow |
| 100 mg Lignin amine as ammonium chloride | 55 | colorless |
| 150 mg Lignin amine as ammonium chloride | 45 | colorless |
| 250 mg Lignin amine as ammonium chloride | 45 | colorless |
| 5 mg PERCOL 763 ® | 153 | yellow |
| 10 mg PERCOL 763 ® | 130 | yellow |
| 15 mg PERCOL 763 ® | 85 | yellow |
| 20 mg PERCOL 763 ® | 20 | yellow |
| 25 mg Lignin amine as ammonium chloride[c] 10 mg PERCOL 763 ® | 13 | slightly yellow |
| 50 mg Lignin amine as ammonium chloride[c] 10 mg PERCOL 763 ® | 17 | colorless |

[a]Amount of flocculant is added based on 100% activity.
[b]Prepared as described in Example 1.
[c]The preferred product is a condensation product of softwood kraft lignin, aminoethylpiperazine/triethylenetetramine blend and formaldehyde acidified with hydrochloric acid as described in Example 10.

EXAMPLE 16

In this example, Tables II and III show the improved performance of the lignin polyamines as filtration aids for secondary papermill sludge when they are prepared according to Example 1 and post-reacted with DOWQUAT 188 ® as described in Example 7.

TABLE II
FILTRATION OF SECONDARY SLUDGE CONDITIONED WITH 9 GRAMS 0.5% FLOCCULANT SOLUTION PER 200 ml SLUDGE

| Flocculant[a] | Filtration Time (sec.) | |
|---|---|---|
| | Sludge #1 | Sludge #2 |
| No flocculant | 214 | 240 |
| Lignin polyamine[b] | 106 | |
| [LPA] - 1N+[c] | 93 | |
| [LPA] - 2N+[c] | 94 | |
| [LPA] - 3N+[c] | 89 | |
| [LPA] - 4N+[c] | | 85 |

TABLE II-continued

FILTRATION OF SECONDARY SLUDGE CONDITIONED WITH 9 GRAMS 0.5% FLOCCULANT SOLUTION PER 200 ml SLUDGE

| Flocculant[a] | Filtration Time (sec.) | |
|---|---|---|
| | Sludge #1 | Sludge #2 |
| [LPA] - 5N+[c] | | 90 |

[a]Adjusted to pH 2.5.
[b]Kraft lignin reacted with 3 moles aminoethylpiperazine and 5 moles formaldehyde per 1,000 grams lignin, [LPA].
[c]Reacted with number of moles DOWQUAT 188 ® per 1,000 grams lignin polyamine [LPA].

TABLE III

FILTRATION OF SECONDARY SLUDGE CONDITIONED WITH PERCOL 763/LIGNIN AMINE BLENDS (0.5% Solution)

| Flocculant | Amount of Flocculant[a] (ml) | Filtration Time (sec.) |
|---|---|---|
| No flocculant | — | 228 |
| Lignin polyamine [LPA] | 5.0 | 70 |
| PERCOL 763 ®[b] | 5.0 | |
| [LPA] - 4N+[c] | 5.0 | 29 |
| PERCOL 763 ®[b] | 5.0 | |
| [LPA] - 4N+[c] | 5.0 | 16 |
| PERCOL 763 ®[b] | 5.0 | |
| PERCOL 763 ®[b] | 9.0 | 57 |

[a]0.5% lignin amine solution at pH 2.5; ml per 200 ml
[b]Polyacrylamide (Allied Colloids)
[c]Lignin polyamine reacted with 4 moles DOWQUAT 188 ® per 1,000 grams [LPA]

EXAMPLE 17

This example shows the utility of an acidified lignin-polyamine as a sludge conditioner for the dewatering of secondary papermill sludge with a solid bowl centrifuge (Ingersoll-Rand). Table IV shows the benefit of the addition of the low cost lignin polyamine to PERCOL 763 ®. In order to obtain adequate performance, 18–20 lbs PERCOL 763 ®/ODT (oven dried ton) secondary sludge has to be used. Good mechanical floc strength is required in order to obtain clean centrate, which is low in suspended particulate matter.

EXAMPLE 18

This example shows the ability of lignin polyamines of Example 1 to precipitate surface-active materials from dilute solution. These surface-active materials, classified as wetting agents, detergents, emulsifiers, or dispersants, are environmentally non-acceptable and have to be removed from waste water streams. Through the interaction of the phenolic groups, sulfonic acid groups and the carboxyl groups of the chemicals described below with the nitrogens of the lignin polyamines, water insoluble complexes are formed. These high molecular weight aggregates settle and can be removed from the water by filtration or centrifugation techniques.

In a series of experiments 0.5 gram of surface active material was dissolved in 800 ml of water and adjusted to pH 6.5–7.5. These dilute solutions were titrated with 1.3% lignin polyamine solution (pH 2.5) until all the surface active material had been precipitated. The end point of the titration was reached when the dark color of the water disappeared or, in case of light colored water, until the water was darkened by the excess of lignin polyamine.

Table V shows the amount of lignin polyamine necessary to precipitate the surface active chemicals.

TABLE V

PRECIPITATION OF SURFACE ACTIVE MATERIALS WITH LIGNIN POLYAMINES

| Surface Active Chemical | Solution (ml) Added for Precipitation |
|---|---|
| Sulfonated kraft lignin A | 17.4 |
| Sulfonated kraft lignin B | 20.0 |
| Oxidized kraft lignin | 8.9 |
| Kraft black liquor adjusted to pH 7 | 5.1 |
| Ammonium lignosulfonate (Orzan A ® ) | 14.0 |
| Naphthalene sulfonate (Tamol SN ® ) | 20.6 |
| Sulfonated tall oil fatty acid | 18.0 |
| Carboxylated tall oil fatty acid (Diacid 1500 ® ) | 16.2 |
| α - Olefin sulfonate | 15.8 |
| Dodecylbenzylsulfonate | 17.2 |
| Tall oil N—methyl taurate | 16.5 |

TABLE IV

DEWATERING OF SECONDARY PAPERMILL SLUDGE USING A SOLID BOWL CENTRIFUGE

| Polymer 13 lbs PERCOL 763[b] plus: | Percent Lignin Amine Content | Cake Solids % | Centrate Solids (ppm)[a] | Polymer + Lignin Flow (gpm) | Amine (% Solids) | Feed Sludge Flow (gpm) | Lbs/ ODT |
|---|---|---|---|---|---|---|---|
| 130 lbs 10% lignin amine | 50.0 | 9.5 | 830 | 8.0 | (0.50) | 300 | 22.22 |
| 130 lbs 10% lignin amine | 50.0 | 9.8 | 780 | 8.5 | (0.50) | 300 | 23.61 |
| 160 lbs 10% lignin amine | 55.2 | 8.9 | 860 | 8.0 | (0.56) | 300 | 24.90 |
| 160 lbs 10% lignin amine | 55.2 | 7.9 | 1,745 | 7.5 | (0.56) | 300 | 23.30 |
| 200 lbs 10% lignin amine | 60.6 | 8.9 | 1,890 | 7.5 | (0.64) | 300 | 26.70 |
| 200 lbs 10% lignin amine | 60.6 | 8.1 | 1,655 | 8.0 | (0.64) | 300 | 28.24 |

Note:
Conditions:
Feed solids: 1.2%
Bowl speed: 1,440 rpm
Scroll speed: 798 rpm
[a]Less than 1,000 ppm, good; 1,000–2,000 ppm, acceptable
[b]Polyacrylamide manufactured by Allied Chemicals After precipitation the floc size can be improved by addition of small amounts (1-2 ml 0.5% solution) of high molecular weight cationic polyacrylamides such as PERCOL 763 ® (manufactured by Allied Chemicals).

EXAMPLE 19

This example shows the efficiency of a quaternized lignin-polyamine as a retention aid for neutral size on pulp. The preferred lignin-polyamine is a derivative prepared with chlorohydroxypropyltrimethyl ammonium chloride according to Example 7. Each sample contained 562 grams slurry pulp, 50 grams sodium bicarbonate for pH adjustment, 8.1 grams BKD emulsion (a commercially available ketene dimer alkaline size), and 0.3 lb/ton Reten 523P (Hercules). In addition, samples #1–#3 contained 56.2 grams (2 lbs/ton), 140.5 grams (5 lbs/ton), or 281 grams (10 lbs/ton) lignin-7N+ polyamine, a kraft lignin reacted with chlorohydroxypropyltrimethyl ammonium chloride. Samples #4–#6 likewise contained 56.2 grams, 140.5 grams, and 281 grams of a Mannich-type lignin amine product, lignin polyamine-4N+ [softwood kraft lignin aminoethylpiperazine (3 moles)-formaldehyde (5 moles)-Quat 188 (4 moles)]. Table VI shows the results obtained.

TABLE VI
EVALUATION OF QUATERNIZED LIGNIN POLYAMINES AS RETENTION AID FOR CATIONIC SIZE

| Sample | BKD, #/ton | pH | Size Promoting Aid #/ton | Reten 523P, #/ton | Off-Machine Sizing[a] (sec.) | HST[b] (sec.) |
|---|---|---|---|---|---|---|
| #1 | 2 | 8.0 | 2 | 0.3 | 11 | 686 |
| #2 | 2 | 8.0 | 5 | 0.3 | 38 | 928 |
| #3 | 2 | 8.0 | 10 | 0.3 | 37 | 861 |
| #4 | 2 | 8.0 | 2 | 0.3 | 1,247 | 1,178 |
| #5 | 2 | 8.0 | 5 | 0.3 | 1,598 | 1,152 |
| #6 | 2 | 8.0 | 10 | 0.3 | 3,020 | 1,734 |

[a] Hercules Size Test (HST)
[b] 7 days later

Excellent size retention was obtained by both products.

The results indicate that these products have potential as a cationic size retention aid for kraft paper. Although the dark brown color of lignin tends to decrease the brightness of bleached paper, the quantity needed for a specific amount of sizing may nevertheless meet brightness qualifications for bleached paper.

EXAMPLE 20

This example shows the effectiveness of a lignin-formaldehyde-polyamine condensate as a corrosion inhibitor for mild steel in mineral acids. The tests were performed on 1010 mild steel coupons (Q-Panel Company, Cleveland, Ohio, about 6 sq. inches of surface area (3"×1"×⅛") and 12.5 grams weight).

A condensation product of softwood kraft lignin, formaldehyde and aminoethylpiperazine as described in Example 1 was diluted to 13% solids and acidified with hydrochloric acid as described in Example 10. Various amounts of this solution were added to either 130 grams 2% hydrochloric acid or 130 grams 2% sulfuric acid prior to the insertion of the steel panels. The corrosion test was carried out at 25° C., and the effectiveness was determined by weight loss of the panels. The results are shown in Table VII.

TABLE VII
CORROSION INHIBITION OF MILD STEEL IN HYDROCHLORIC AND SULFURIC ACID

| Inhibitor (mg) | Weight Loss (g) | |
|---|---|---|
| | 50 hrs. | 86 hrs. |
| 2% HCl | | |
| blank | 0.3632 | 0.6731 |
| 260 | 0.0664 | 0.1005 |
| 520 | 0.0611 | 0.0850 |
| 780 | 0.0555 | 0.0802 |
| 1040 | 0.0538 | 0.0792 |
| 1300 | 0.0526 | 0.0750 |
| 2% $H_2SO_4$ | | |
| blank | 1.0234 | 1.4577 |
| 260 | 0.0501 | 0.0755 |
| 520 | 0.0440 | 0.0315 |
| 780 | 0.0388 | 0.0616 |
| 1040 | 0.0373 | 0.0599 |
| 1300 | 0.0338 | 0.0576 |

While this invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. In a method for sizing wood pulp under substantially neutral pH conditions, the improvement of enhancing size retention on the pulp comprising sizing the wood pulp in the presence of a lignin derivative prepared by reacting lignin with an aldehyde, or an aldehyde producing substance, and a polyamine.

2. The method of claim 1 wherein the lignin derivative starting lignin material is selected from the group consisting of lignin substantially free from sulfonic acid groups and lignin containing a significant amount of sulfonic acid groups.

3. The method of claim 2 wherein the lignin substantially free from sulfonic acid groups is selected from the group consisting of kraft lignin, the low molecular weight lignin by-product of vanillin production, and desulfonated sulfite pulping process lignosulfonic acids.

4. The method of claim 2 wherein the lignin containing a significant amount of sulfonic acid groups is selected from the group consisting of lignosulfonic acids.

5. The method of claim 4 wherein the lignosulfonic acids are selected from the group consisting of lignosulfonic acids isolated from spent sulfite pulping liquors and sulfonated kraft lignin.

6. The method of claim 5 wherein the sulfonated kraft lignin is prepared by high temperature sulfonation.

7. The method of claim 5 wherein the sulfonated kraft lignin is prepared by oxidative sulfonation at ambient temperature.

8. The method of claim 5 wherein the sulfonated kraft lignin is prepared by sulfomethylation.

9. The method of claim 3 wherein the lignin is kraft lignin selected from the group consisting of hardwood lignin and softwood lignin.

10. The method of claim 9 wherein the kraft lignin is pretreated by demethylation.

11. The method of claim 1 wherein the lignin derivative is an ion selected from the group consisting of cation and anion.

12. The method of claim 1 wherein the lignin derivative is a quaternized lignin-polyamine.

* * * * *